July 7, 1931.                J. T. SUTLIFF                1,813,644
METER CONNECTION AND SUPPORT
Filed May 10, 1928
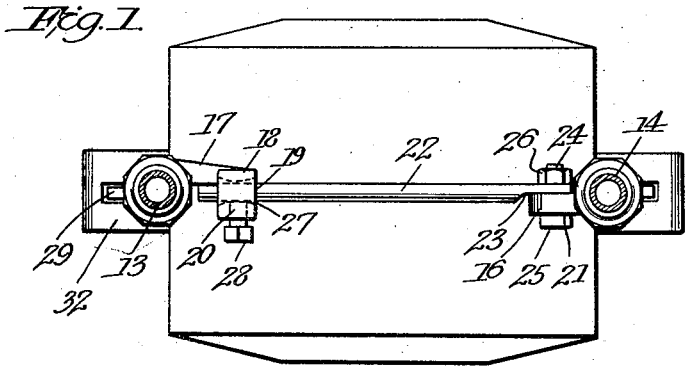

Patented July 7, 1931

1,813,644

UNITED STATES PATENT OFFICE

JAMES T. SUTLIFF, OF DECATUR, ILLINOIS, ASSIGNOR TO MUELLER CO., OF DECATUR, ILLINOIS, A CORPORATION OF ILLINOIS

METER CONNECTION AND SUPPORT

Application filed May 10, 1928. Serial No. 276,687.

The present invention relates to a meter connection and support and is primarily useful in connection with gas meters.

It is the principal aim of this invention to provide a simple construction which may be easily positioned and which will permit of adjusting the device to meet and compensate for various inequalities in the position of the various pipes.

The invention is designed to relieve the inlet and outlet pipes of strain which has frequently resulted in their breakage, with consequent escape of gas, making a dangerous condition.

The invention also eliminates the use of the usual stationary shelf, since the strains are absorbed by the connection.

In a practical application, it is required that the thimbles usually employed be longitudinally adjustable, as well as laterally adjustable or tiltable and also vertically tiltable, because the pipes are either out of alignment or of different lengths and in some cases both conditions exist. Hence, the present invention aims to provide an efficient construction capable of compensating adjustments for all these contingencies.

Referring to the drawings,

Figure 1 is a top plan view partly in section, and

Figure 2 is a side elevation.

The numeral 10 indicates the meter and the numerals 11 and 12 the inlet and outlet pipes thereto. The numerals 13 and 14 indicate the inlet and outlet pipes from the gas main to the meter and from the meter to the house, respectively.

The invention comprises thimbles indicated at 15, adapted to be connected to the pipes 11 and 12, as shown.

The thimbles are provided with lateral extensions, one of which is shown at 16, being simply a right angle projection having a rounded end and flat sides. The extension may be made integral with the thimble or as a separate part. It will be understood that the extension and thimble are preferably cast as a complete article.

The other thimble 15 is provided with an extension 17, having an enlarged end 18 which extends laterally with respect to the body portion 17 and preferably at a right angle thereto. The enlarged portion 18 has a longitudinal opening 19 therein and a lateral opening 20, which communicates with said opening 19 and is preferably threaded.

In this connection, the extension 16 is also provided with a threaded opening 21 for a purpose which will now be described.

In order to connect the thimbles and to permit of all of the adjustment necessary, namely, vertical and lateral tilting and longitudinal spacing of the thimbles, I provide a connecting bar 22.

This bar is secured to the extensions 16 and 17 in the relation shown and it will be observed that at one end where the bar is attached to the extension 16, it is cut away, as shown at 23, to provide a flat recess, and this reduced end has formed therein an opening 24. Instead of an opening, the bar may be slotted and where the opening is provided, such opening may or may not be threaded.

The flat side of the reduced end is adapted to contact with the adjacent flat side of the extension 16, and the bar is connected to the extension by means of a bolt 25, passing through the openings in the several parts, to which is threaded a nut 26, whereby the bolt may be pivoted with respect to the extension, or vice versa, and the parts locked together. Obviously, tightening of the bolt will draw the two flat surfaces together and maintain the end of the bar and the extension in firm contact. When the nut is loosened, it will be equally clear that the bar and the extension may be pivoted upon the bolt 25 to provide for vertical tilting. The bar 22 at its other end is received in the longitudinal opening 19 of the enlargement 18, and it will be clear that the bar can be slidably mounted in the extension 17, by reason of its adjustment in the said opening. I have illustrated this end of the bar as cylindrical, but clearly it may be of any desired shape and the shape of the recess 19 may conform to the shape of the bar, or be of a different contour. Preferably, however, the opening and the bar are circular in cross section. The bar is positioned in the opening 19 and may be adjusted therein and firmly held by means of a bolt 28, which is threaded in the opening 20. The free end of the bolt is adapted to be screwed into contact with the adjacent surface of the bar 22 to hold the parts fixed.

In applying the invention, the thimbles may be positioned upon the pipes 11 and 12, or upon the pipes 13 and 14 and thereafter the bar may be applied by passing it into the opening 19 and then connecting it with the extension 16 in the manner described.

It will be clear that longitudinal adjustment is provided by reason of the sliding relation of the bar with the enlargement on the extension 17, lateral tilting is afforded, since the thimble and extension 17 may be rotated upon the bar 22, due to its engagement in the opening therein, vertical tilting is possible by reason of the play between the parts and where the vertical tilting required is considerable, the pivotal relation provided by the connection of the bar with the extension 16 may be utilized.

Thus, regardless of the position of the pipes and their alignment, the connection may be adjusted to meet practically every condition.

It is an object of the invention to eliminate the usual stationary meter shelf and this has been previously accomplished by providing a shelf which is supported from the connection.

In the present case, the thimbles are provided with ears 29, having openings therein, from which are loosely suspended rods 30, which may be of any suitable material. For instance, the rods may be stiff, rigid or flexible, and in some cases may be in the nature of chains.

The lower ends of the rods are preferably threaded to receive nuts 31.

Mounted upon the said rods, to be carried thereby, is a shelf 32 which, as shown, is adapted to support the bottom of the meter, being provided with a flat surface for this purpose. This shelf may be in the form of a flexible, resilient strip of metal having its ends bent downwardly and then returned upon itself, as shown at 33 and 34. The extended portions 33 and 34 may be provided with suitable openings 35, to receive the rods. Such openings may be elongated to form slots, so as to permit the adjustment of the rods with respect to various widths of meters. However, an elongated slot may be only formed in the portion 34 to permit of some slight adjustment of the rod therein.

It will be seen that a resilient support or shelf for the meter is provided, which is suspended from the thimbles and by reason of the rigid construction of the connection, the shelf will be efficient because the strain is equally distributed upon all of the parts. It will be observed that the shelf by reason of the threaded relation of the nuts to the rods may be suitably adjusted to meet the requirements of various sizes and weights of meters.

By the provision of this construction, the shelf provides a resilient cushion for the meter and the position of the said shelf and the amount of its resiliency may be controlled by adjustment of the nuts 31.

The opening 21 in the extension 16 may be square or of angular configuration and need not be threaded. The bolt 25 may have a configuration such as will not permit it to turn within such squared opening, or any configuration which will prevent it from rotating and hence turning the tightening nut 26.

What I claim is:

1. In a device of the class described, thimbles, opposed inward extensions integral therewith, one of said extensions having an integral enlargement provided with an opening, the other extension having an opening extending at right angles to said first mentioned opening, a bar engaging in the first mentioned opening whereby the thimble is slidable and rotatable thereon and means engaging in said second opening for pivotally and adjustably connecting said bar to the other extension.

2. In a device of the class described, the combination of meter thimbles to engage inlet and outlet pipes, extensions rigid on said thimbles in opposed relation to each other, and a rigid rod engaged at one end for pivotal adjustments only to one of said thimble extensions, said rod being slidably engaged at its other end for longitudinal adjustments only to the other of said thimble extensions; whereby relative vertical and lateral adjustment of said thimbles can be effected by loosening one end only of the rod.

3. In a device of the class described, thimbles adapted for attachment to a meter and the inlet and outlet supply pipes, integral opposed inward extensions on said thimbles, a single rigid bar connected at its ends to said extensions, one of said thimbles being longitudinally slidable and rotatable upon said bar, and the other thimble being pivotally adjustable on said bar.

In testimony whereof I have hereunto set my hand.

JAMES T. SUTLIFF.